US009348647B2

(12) United States Patent
Shu et al.

(10) Patent No.: US 9,348,647 B2
(45) Date of Patent: *May 24, 2016

(54) EXECUTE OR CANCEL A SCHEDULED TASK THAT MISSED EXECUTION CONDITION ON A DEVICE BASED ON RULE AND EXECUTION CONDITION RECEIVED FROM A MANAGEMENT SERVER

(71) Applicant: Huawei Technologies Co., Ltd., Shenzhen (CN)

(72) Inventors: Qi Shu, Shenzhen (CN); Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/496,787

(22) Filed: Sep. 25, 2014

(65) Prior Publication Data
US 2015/0012922 A1    Jan. 8, 2015

Related U.S. Application Data

(63) Continuation of application No. 11/478,364, filed on Jun. 29, 2006, now Pat. No. 8,875,141.

(30) Foreign Application Priority Data

Jun. 30, 2005  (CN) .......................... 2005 1 0080264
Apr. 17, 2006  (CN) .......................... 2006 1 0066651

(51) Int. Cl.
G06F 9/48       (2006.01)
G06F 11/07      (2006.01)

(52) U.S. Cl.
CPC .......... *G06F 9/4881* (2013.01); *G06F 11/0715* (2013.01); *G06F 11/0742* (2013.01); *G06F 11/0751* (2013.01)

(58) Field of Classification Search
None
See application file for complete search history.

(56) References Cited

U.S. PATENT DOCUMENTS

| 5,379,436 | A  | 1/1995 | Tanaka |
| 5,650,940 | A  | 7/1997 | Tonozuka et al. |
| 5,748,892 | A  | 5/1998 | Richardson |
| 6,289,399 | B1 | 9/2001 | Furuichi et al. |

(Continued)

FOREIGN PATENT DOCUMENTS

| CN | 1450780 A | 10/2003 |
| CN | 1512382 A | 7/2004  |

(Continued)

OTHER PUBLICATIONS

The English Translation of Written Opinion of the International Search Authority, PCT/CN2006/001448.

(Continued)

*Primary Examiner* — Abdullah Al Kawsar
(74) *Attorney, Agent, or Firm* — Slater Matsil, LLP

(57) ABSTRACT

The present invention provides an improved method and device for task processing in a device management. When the current state or the operation of the terminal device is interrupted by an abnormal condition, the method includes checking if any scheduler task exists; prompting the user to select the processing procedure for the scheduler task based on the types of the scheduler task, or processing the impacted scheduler task based on user's selection or processing the scheduler task based on a predetermined process procedure.

4 Claims, 5 Drawing Sheets

(56) References Cited

U.S. PATENT DOCUMENTS

| | | |
|---|---|---|
| 7,197,635 B2 | 3/2007 | Keohane et al. |
| 7,472,388 B2 | 12/2008 | Fukunari et al. |
| 7,685,269 B1 | 3/2010 | Thrasher et al. |
| 7,721,290 B2 | 5/2010 | Horikawa |
| 7,809,366 B2 | 10/2010 | Rao et al. |
| 7,827,560 B2 | 11/2010 | Bayer |
| 2002/0124000 A1 | 9/2002 | Ooishi |
| 2003/0214657 A1 | 11/2003 | Stringham |
| 2004/0030533 A1 | 2/2004 | Hirose et al. |
| 2004/0102228 A1 | 5/2004 | Hakamata et al. |
| 2004/0136274 A1 | 7/2004 | Mohler et al. |
| 2004/0148419 A1 | 7/2004 | Chen et al. |
| 2004/0172469 A1 | 9/2004 | Takahashi et al. |
| 2004/0178987 A1 | 9/2004 | Chen et al. |
| 2004/0181706 A1 | 9/2004 | Chen et al. |
| 2004/0215709 A1 | 10/2004 | Basani et al. |
| 2004/0250249 A1 | 12/2004 | Fukunari et al. |
| 2005/0052684 A1 | 3/2005 | Ferlitsch |
| 2006/0026228 A1 | 2/2006 | Kim |
| 2006/0059488 A1 | 3/2006 | Lin |
| 2006/0080656 A1 | 4/2006 | Cain et al. |
| 2006/0101290 A1 | 5/2006 | Ma |
| 2006/0236325 A1 | 10/2006 | Rao et al. |
| 2006/0259908 A1 | 11/2006 | Bayer |
| 2007/0011681 A1 | 1/2007 | Shu et al. |
| 2008/0168127 A1 | 7/2008 | Hernandez |

FOREIGN PATENT DOCUMENTS

| | | |
|---|---|---|
| CN | 1512383 A | 7/2004 |
| CN | 1622522 A | 6/2005 |
| CN | 1673960 A | 9/2005 |
| CN | 1794856 A | 6/2006 |
| CN | 10103969 A | 8/2007 |
| CN | 101013969 A | 8/2007 |
| CN | 101142568 A | 3/2008 |
| CN | 101194466 A | 6/2008 |
| EP | 1278127 A1 | 1/2003 |
| JP | 2001521223 A | 11/2001 |
| JP | 2002041311 A | 2/2002 |
| JP | 2002077377 A | 3/2002 |
| JP | 2002291027 A | 10/2002 |
| JP | 2002314711 A | 10/2002 |
| JP | 2003032172 A | 1/2003 |
| JP | 2004318763 A | 11/2004 |
| JP | 20085524731 T | 1/2008 |
| KR | 1020060105639 A | 10/2006 |
| WO | 9921101 | 4/1999 |
| WO | 0173569 A1 | 10/2001 |
| WO | 2007003106 A1 | 1/2007 |

OTHER PUBLICATIONS

The English Translation of Written Opinion of the International Search Authority for PCT/CN2007/000921.

The Second Chinese Office Action for Counterpart CN Appln. 200610086759.1.

Office Action and Translation received in Japanese Patent Application No. 2007-547153, mailed Mar. 2, 2010, 6 pages.

Final Office Action and Translation received in Japanese Patent Application No. 2007-547153, mailed Apr. 3, 2012, 6 pages.

OMA Open Mobile Alliance; "Open Mobile Alliance OMA-TS-DM_Bootstrap-V1_2-20070209-A," OMA Device Management Bootstrap Approved Version 1.2, Feb. 9, 2007; 2007 Open Mobile Alliance Ltd. All Rights Reserved, 28 pages.

OMA Open Mobile Alliance; "Open Mobile Alliance OMA-TS-DM_Notification-V1_2-20070209-A," OMA Device Management Notification Initiated Session Approved Version 1.2, Feb. 9, 2007; 2007 Open Mobile Alliance Ltd. All Rights Reserved.

OMA Open Mobile Alliance; "Open Mobile Alliance OMA-TS-DM_Protocol-V1_2-20070209-A," OMA Device Management Protocol Approved Version 1.2, Feb. 9, 2007; 2007 OpenMobile Alliance Ltd. All Rights Reserved, 53 pages.

OMA Open Mobile Alliance; "Open Mobile Alliance OMA-TS-DM_RepPro-V1_2-20070209-A," OMA Device Management Representation Protocol Approved Version 1.2, Feb. 9, 2007; 2007 Open Mobile Alliance Ltd. All Rights Reserved, 47 pages.

OMA Open Mobile Alliance; "Open Mobile Alliance OMA-TS-DM_Security-V1_2-20070209-A," OMA Device Management Security Approved Version 1.2, Feb. 9, 2007:2007 Open Mobile Alliance Ltd. All Rights Reserved, 27 pages.

OMA Open Mobile Alliance; "Open Mobile Alliance OMA-TS-DM_StdObj-V1_2-20070209-A," OMA Device Management Standardized Objects Approved Version 1.2, Feb. 9, 2007; 2007 Open Mobile Alliance Ltd. All Rights Reserved, 29 pages.

OMA Open Mobile Alliance; "Open Mobile Alliance OMA-TS-DM_TND-V1_2-20070209-A," OMA Device Management Tree and Description Serialization Approved 1.2, Feb. 9, 2007; 2007 Open Mobile Alliance Ltd. All Rights Reserved, 19 pages.

OMA Open Mobile Alliance; "Open Mobile Alliance OMA-TS-DM_TND-V1_2-20070209-A," OMA Device Management Tree and Description Approved Version 1.2, Feb. 9, 2007; 2007 Open Mobile Alliance Ltd. All Rights Reserved, 48 pages.

Hernandez, "Device Management Scheduling Method," U.S. Appl. No. 60/669,852, filed Apr. 8, 2005, pp. 1-22.

Shu, Q., et al., English Abstract of Chinese Patent No. CN 101194466 A, "Method, System and Device for Processing Task in Equipment Management," Huawei Technologies Co. Ltd., Jun. 4, 2008, 3 pages.

United States Office Action received in U.S. Appl. No. 12/251,908, mailed Mar. 12, 2013, 9 pages.

EXECUTE OR CANCEL A SCHEDULED TASK THAT MISSED EXECUTION CONDITION ON A DEVICE BASED ON RULE AND EXECUTION CONDITION RECEIVED FROM A MANAGEMENT SERVER

This application is a continuation of U.S. Pat. No. 8,875,141, filed on Jun. 29, 2006, which claims priority to Chinese Patent Application priority number 200510080264.3, filed Jun. 30, 2005 and to Chinese Patent Application priority number 200610066651.6, filed on Apr. 17, 2006, the disclosures of which are hereby incorporated herein by reference.

TECHNICAL FIELD

The present invention relates to communication field, and specifically, to an improved method, device and system for processing task in device management.

BACKGROUND

Currently, as the functions built in a terminal device have been increasingly complicated, the possibility of failure in terminal operating software is dramatically increased. The terminal device includes, but not limited to, the following devices: cell phone, palmtop, notebook computer, embedded device and on-board system. To effectively guarantee a good usage experience and the service quality and to reduce the maintenance costs of the terminal devices, the Open Mobile Alliance (OMA) has set the device management (DM) V1.2 specification. The OMA DM V1.2 specification defines a unified standard for the overall structure, the protocols, the communication terminal devices and the safety issues for device management.

In the specification, in addition to the synchronous device management model (completing a DM management operation during one session) and the asynchronous device management model (completing a DM management operation during multiple sessions), a model of how to schedule tasks is provided. A Device Management Server (DMS) can set up a task and its triggering condition, and send them to the terminal device side, so that the terminal device can automatically process the DMS management operation according to the scheduled time or the condition even when the terminal device is off line. The overall communicating process flow chart for the management operation task between the service device and the terminal device in the prior art is shown in FIG. 1.

S1. A service device sends an operation notice to a terminal device.

S2. The terminal device establishes a session connection with the service device.

S3. The service device sets up a management operation task.

S4. The terminal device prompts a user to download the management operation task.

S5. The user downloads the management operation task.

S6. The terminal device reports the state of the task.

S7. The service device terminates the session, and sends a session termination message of the management operation task.

S8. The terminal device monitors the processing condition of the management operation task in a state that the processing of the management operation task may not be interfered with. For example, the state that the processing of the management operation task may not be interfered with is a waiting state.

S9. The terminal device processes the management operation task in a state that the processing of the management operation task is not interrupted.

S10. The terminal device establishes a connection with the service device and reports the state of the processing of the management operation task.

S11. The service device terminates the session (or continues to send another management command).

Referring to the communicating process flow chart of FIG. 1, the terminal device can monitor the processing of the management operation task only when it is in a state that the processing of the management operation task is not interrupted. However, the terminal device may randomly encounter an abnormal condition (such as, the terminal device is automatically turned off because the terminal battery runs out, or the terminal device is automatically turned off at the time set by the terminal user, or the terminal device is turned off due to the user's interference); and the occurrence of these abnormities will cause the downloaded management operation task unable to be triggered and processed normally according to the preset triggering conditions.

SUMMARY

The present invention provides an improved method, device and system for processing tasks in a device management.

With the implementation of the present invention in the terminal device, when the processing of the scheduler task or the operation of the terminal device is interrupted by an abnormal condition, the system will check if any management operation task is scheduler and determine the scheduler task to be executed. Based on the executing time limit and the necessity of the tasks, there are four types of the scheduler tasks, the type 1 task is the one that doesn't exceed its executing time limit and is not a necessary task to be executed, the type 2 task is the one that doesn't exceed its executing time limit and must be executed, the type 3 task is the one that has already exceeded its executing time limit and is not a necessary task to be executed, and the type 4 task is the one that already exceeded its executing time limit but must be executed.

If such a task is scheduler, the system will either prompt the user for his selection of the processing procedure to process the scheduler task, or process the task based on a predetermined processing procedure, which includes: processing the task according to a predetermined procedure set up by the user and processing the task according to a default procedure built in the system.

One of the states in which the processing of the scheduler management operation task may be interrupted by an abnormal condition in a terminal device is an off state, where the interruption may happen during the operation of the terminal device, such as the terminal device is in the process of being shut down; the terminal device is in the process of being turned on; the terminal device is in the process of adjusting its system time.

When a terminal device is in an off state and it reaches the time to process a scheduler task, the terminal device will automatically turn itself on, process the scheduler task and turn itself off automatically. Before the terminal device automatically turns itself on, it will check if it is allowed to be turned on based on a predetermined setting by the user.

When the operation of the terminal device is transiting from an on state to an off state, the terminal device uses the actual shutting down time as a starting time in determining the scheduler task(s) during a predetermined time period.

Once the terminal device is turned on, the system identifies the unexecuted scheduler task(s) during the off time period.

After the terminal device has adjusted its time, it identifies the scheduler task(s) during the jumping time period caused by the time adjustment.

Before processing the scheduler task, the terminal device evaluates its own condition to decide if it has resources to process the scheduler task.

Usually, based on the types of the scheduler task, the user has three choices to process the scheduler task: immediately carrying out the processing, delaying the processing, or canceling the processing.

A terminal device management system of the present invention includes a device management server, sending tasks and receiving processing information, and a terminal device, identifying an interrupted scheduler task when the scheduler task is interrupted due to the state of the terminal device or the execution of the terminal device, and processing the scheduler task based on the processing rules, and transferring the processing result to the DM server.

The terminal device includes: a device management task abnormity processing module, which establishes and manages a plurality of abnormal condition procedures, executes the corresponding abnormal condition procedures according to the state of the terminal devices or the type of the interrupted scheduler task(s), processes the scheduler task based on the processing rules, and transfers the processing result to the DM server.

In the device management task abnormity processing module, a processing strategy for abnormal task can be set to decide if a task execution is abnormal.

The terminal device further includes: a device management task processing module, processing the tasks sent by the device management server, reporting execution result, and forwarding an interaction result sent from the device management task abnormity processing module; a device management client module, directly exchanging with the device management server, forwarding the interaction command of the device management server and the terminal device. The device management task processing module processes the task sent by the device management server, including: installing the task, setting the task, monitoring the condition of the task and controlling the triggering of the task.

The device management server of the present invention includes a device management task frame module which sends the task(s) to and receiving the task execution result(s) from the terminal device.

A terminal device of the present invention includes a number of modules. A device management task processing module processes tasks sent from the device management server and reporting the execution results back to the device management server. A device management client module interfaces with a user that communicates with the device management server and exchanges information between the device management server and the terminal device. A device management task abnormity processing module monitors a plurality of abnormal conditions based on the predetermined processing rules, and if there is an abnormal condition, processes according to the processing rules and transfers the processing result to the device management server.

The device management task abnormity processing module transfers the interaction result to the uplink through the device management task processing module and the device management client module, or through the device management client module.

The present invention provides an additional fault-proof mechanism in a terminal device. If a user turns on the abnormal-condition-monitoring function of the fault-proof mechanism in the terminal device, the fault-proof mechanism starts monitoring the occurrence of the abnormal condition.

Before an abnormal condition occurs, i.e., when the terminal device transits from an on state to an off state, the terminal device will use the shutting off time as the beginning time and check the scheduler management operation task which may be affected and take necessary steps to prevent any faulty results from happening due to a possible occurrence of an abnormal condition.

If the abnormal condition occurs, the terminal device will automatically turn on the terminal device at the scheduled processing time, process the scheduler task and then turn the terminal device off.

If an abnormal condition occurs, especially when the terminal device is transiting from an off state to an on state, or after adjusting its time, the terminal device checks if there is any scheduler task which should be processed, and if there is, processes the scheduler task to remedy the damage caused by the occurrence of the abnormal condition.

Through the implementation of the present invention, the terminal device will monitor the processing of the scheduler management operation task(s) under the abnormal condition. It will process the scheduler task either based on the choice of the user or on the default setting of the system. The present invention can be implemented into an existing system and devices.

DETAILED DESCRIPTION OF ILLUSTRATIVE EMBODIMENTS

The embodiment of the invention provides an improved method, device and system for processing a scheduler task according to its predetermined triggering condition under an abnormal condition (the current state or operation of the terminal device interferes with the processing of the scheduler management operation task). The interruption of processing the scheduler task under the abnormal condition can be divided into two situations. One is due to the current state of the terminal device and the other is due to the operation of the terminal device. The operation of the terminal device which causes an interruption is further divided into three situations: 1. The terminal device is transiting from an on state to an off state; 2. The terminal device is transiting from an off state to an on state; 3. The terminal device is in an on state but has adjusted its time.

The following examples illustrate the operation of the terminal device which interferes with the processing of the scheduler task.

EXAMPLE 1

Figure 1:
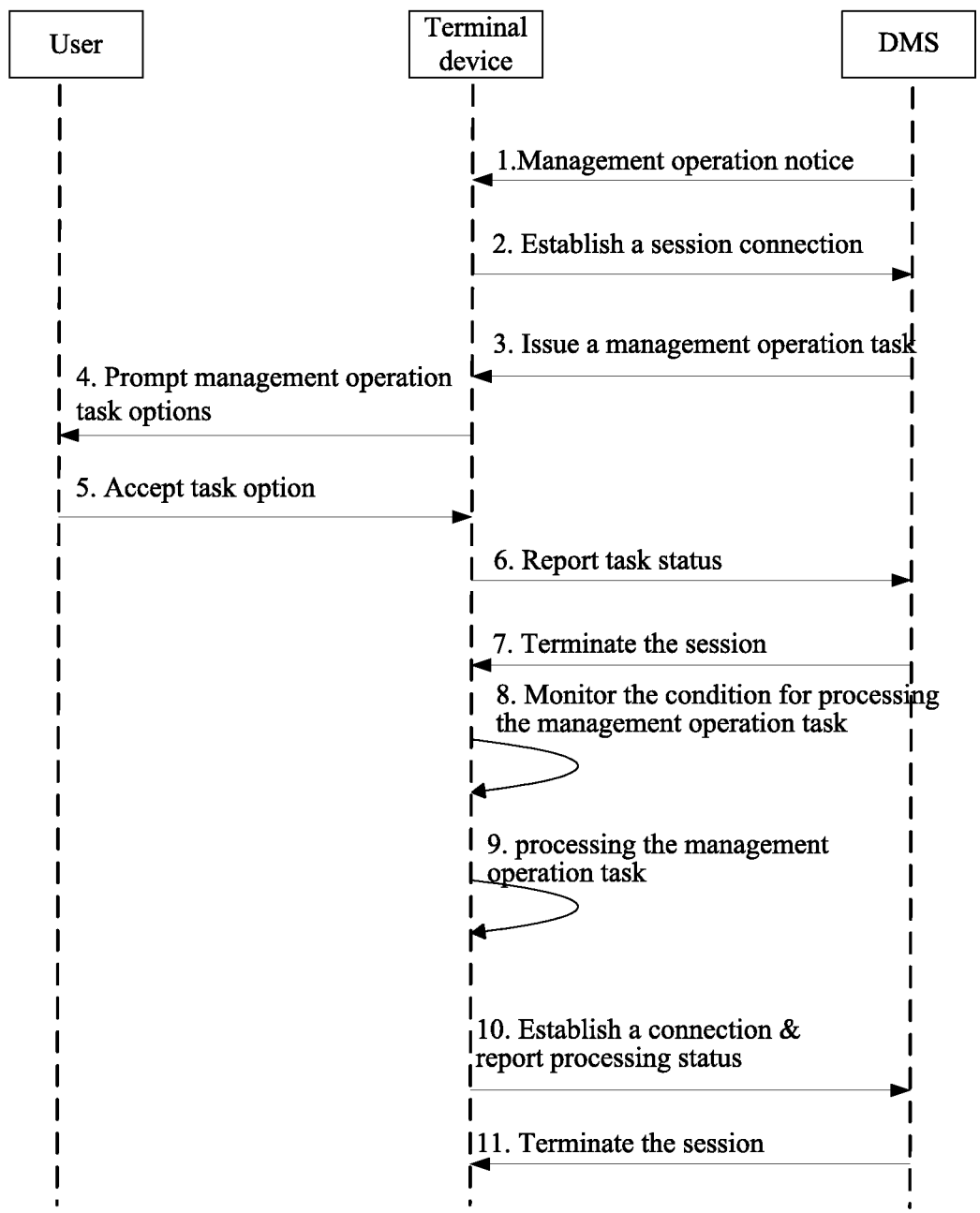
FIG. 1 is an overall communicating process flow chart for the management operation task between the service device and the terminal device in the prior art.
Figure 2:
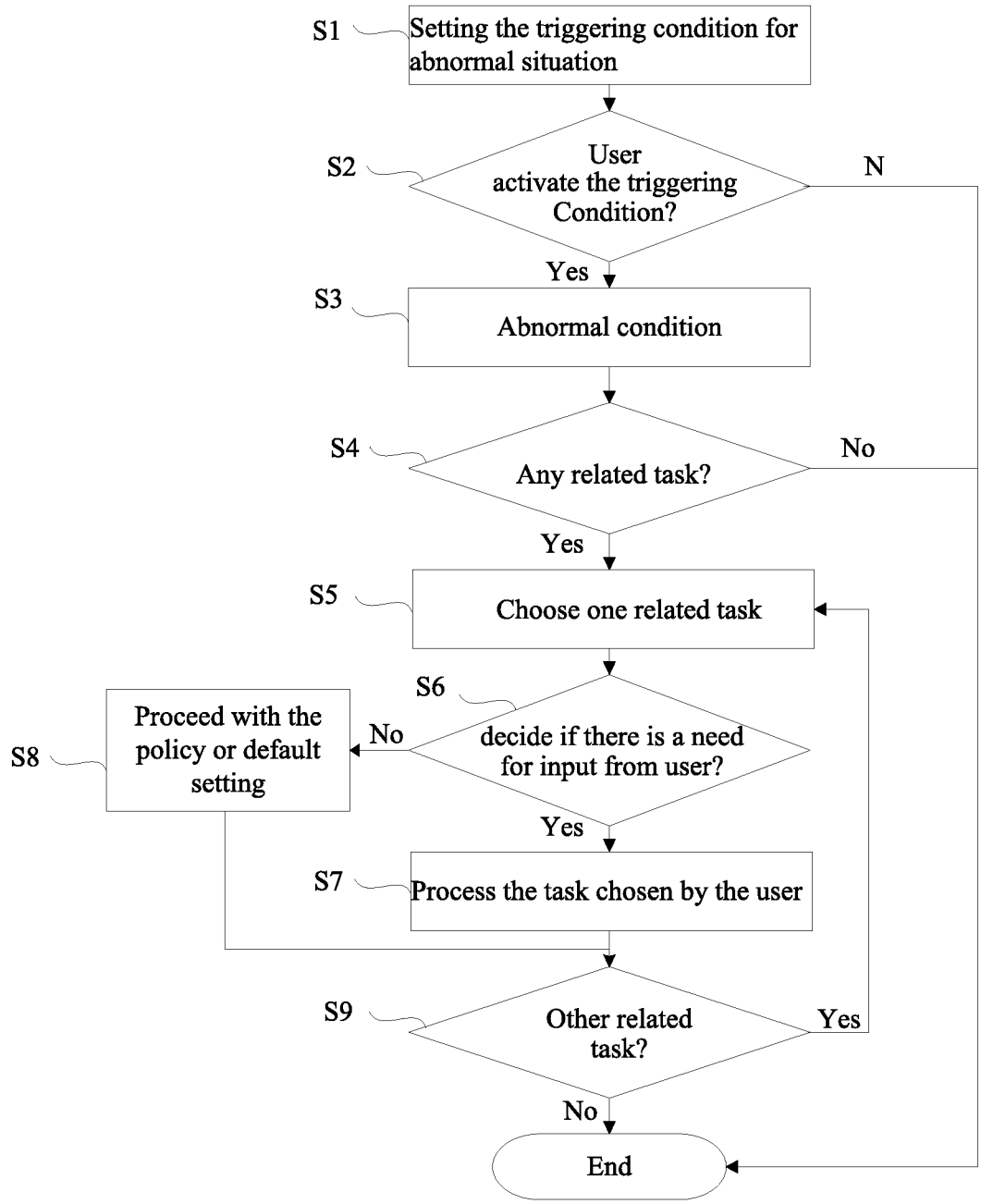
FIG. 2 is a task processing flow chart of a terminal device when transiting from an on state to an off state according to an embodiment of the present invention.

A terminal device is transiting from an on state to an off state, which interferes with the processing of the scheduler task. The processing steps are shown in FIG. 2.

S1. Setting the triggering conditions in the terminal device. The triggering conditions include:

The condition for detecting the abnormal situation. For example, the electric quantity of the battery of the terminal device is less than 5% or a pre-defined shut-off time is approaching, or a user is turning off the terminal device.

The triggering condition of the scheduler task. For example, set a time period of 8 hours for an abnormal condition from the time when the terminal device is turned off. Any tasks scheduled to be processed within 8 hours are the tasks to be interfered with.

The processing rules. The processing rules can be based on the predetermined processing procedure, i.e., the processing rules delivered by the DM server or pre-set by the user. Or the scheduler tasks can be processed based on a user's choice or in a default manner. The processing rules delivered by the DM server includes: processing the task immediately, delaying to a certain time, or canceling the processing, and reporting to the DM server. For example: for a scheduler type 1 task, the user can choose to process the task immediately, or delay the task to a certain time, or cancel the processing. For a scheduler type 2 task, the user can't choose to cancel the processing. For a scheduler type 3 task, the user can choose to process the task immediately or cancel the processing. For a scheduler type 4 task, the user is not allowed to make any choice, and the terminal device will directly process the task based on the default setting. The user of a type 1, 2 or 3 task can also set up a predetermined procedure for the tasks. When the terminal device is processing the task, it will not prompt the user to make a choice again, instead it will process the task based on a predetermined procedure set by the user.

S2. A user may choose to activate or not activate the monitoring of the triggering condition. If the user chooses not to activate the monitoring of the triggering condition, the operation is the same as that in the prior art where the user is not reminded when an abnormal condition occurs. If the user chooses to activate the monitoring of the triggering condition, the monitoring of the occurrence of the said abnormal condition is started.

S3. Detecting if there is an abnormal condition, for example, at the time 18:00 the electric quantity of the terminal device's battery is less than 5% of its total capacity.

S4. In this embodiment of the present invention, the time of 18:00 is used as the starting time to check if any scheduler task is scheduled to be processed in the following 8 hours. If there is, the relevant task is determined as the scheduler task. Obviously, the relevant task can be more than one.

S5. If there are at least one scheduler tasks, the terminal device will choose one task to process.

S6. Determining if an input from the user is required in the operation based on the predetermined triggering condition and the processing rules.

S7. If the user's input is required, the terminal device prompts the user to select a trigger time for the task. For example, if the chosen task is a type 1 task, the user can choose the task either to be processed immediately, or not to be processed, or to be delayed and processed at a later time.

S8. If an input from the user is not required, the terminal device directly processes the scheduler task based on the predetermined process rules or the default setting. For example, the task may be processed directly.

S9. After the scheduler task is processed upon the user's choice, or is processed by the terminal device based on the predetermined processing rules or the default procedure, it is decided if there are any other scheduler tasks to be processed. If there are, jump to the step of choosing one scheduler task to be processed, and continue the processing therefrom. If there is no more scheduler tasks, i.e. all the scheduler tasks have been processed, the terminal device continues its shutting down operation.

EXAMPLE 2

Figure 3:
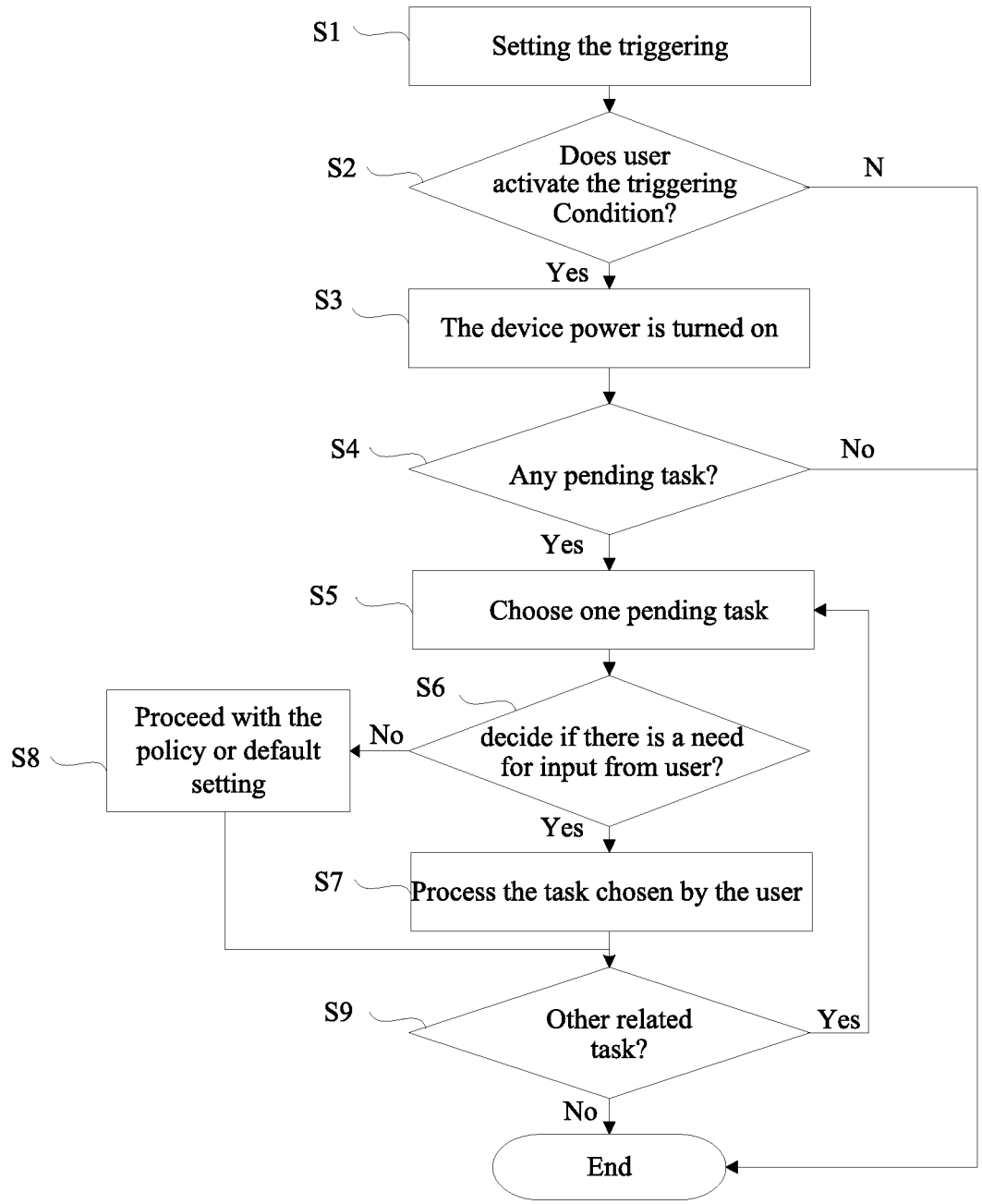
FIG. 3 is a task processing flow chart of a terminal device when transiting from an off state to an on state according to an embodiment of the present invention.

The condition under which a terminal device is transiting from an off state to an on state. FIG. 3 illustrates the processing flow chart.

S1. Setting the triggering condition in the terminal device. The triggering condition includes:

The triggering condition for starting checking/monitoring. For example, every time the terminal device is turned on.

The triggering condition for determining the scheduler task. For example, the scheduler task, which should be processed, yet has not been processed, is identified during the last period of the off state of the terminal device.

The processing rules. The processing rules include processing the scheduler task based on the predetermined processing procedure, i.e., the processing rules delivered by the DM server or pre-set by the user, or processing the scheduler task upon a user's choice or on the default procedure. The processing rules delivered by the DM server include: processing the task immediately, delaying to a certain time, or canceling the processing, and reporting to the DM server. For example, for a scheduler type 1 task, the user can choose to process the task immediately, or delay the task to a certain time, or cancel the processing. For a scheduler type 2 task, the user can't choose to cancel the processing; For a scheduler type 3 task, the user can choose to process the task immediately or cancel the processing; For a scheduler type 4 task, the user is not allowed to make any choice, and the terminal device will directly process the task based on the default setting. For the type 1, 2 or 3 task, a user can set up a predetermined procedure. Once the procedure is selected, the task is automatically processed according to the predetermined procedure and the user is not prompted for input.

S2. The user may choose to activate or not to activate the triggering condition. If the user chooses not to activate the triggering condition, the scheduler task will be treated in the same way as that in the prior art. When an abnormal condition occurs, the user is not notified. If a user activates the triggering condition, the system starts to monitor the occurrence of any abnormal condition.

S3. The user turns on the terminal device, for example, the terminal device is turned on at 22:00, where it was turned off at 20:00.

S4. Check if there is any scheduler task that should be processed, yet has not been processed in the period from 20:00 to 22:00. There may be more than one scheduler tasks.

S5. If there are more than one scheduler tasks, one of the scheduler tasks to be processed will be selected.

S6. Decide if the user's input is required based on the selected scheduler task and its triggering condition and the processing rules.

S7. If the user's input is required, the terminal device prompts the user to choose a triggering time for the task. For example, if the chosen task is a type 1 task and it doesn't exceed its processing time, the user can choose either to process the task immediately, or not to process, or delay the processing to a later time. Or if the chosen task is a type 3 task, i.e., the task has exceeded the last processing time limit and has not been processed, the user may choose to process the scheduler task immediately or not to process the scheduler task.

S8. If the user's input is not required, the terminal device processes the task based on the predetermined processing rules and the default setting. For example, the task may be processed directly.

S9. After the scheduler task is processed upon the user's choice, or is processed by the terminal based on the predetermined processing rules or the default procedure, check if there are any other scheduler tasks to be processed. If there are, jump to the step of choosing one scheduler task to be processed, and continue the process therefrom.

EXAMPLE 3

The scheduler task is interrupted because the terminal device has adjusted its system time.

S1. Setting the triggering condition in the terminal device. The triggering condition includes the following conditions.

The condition for activating the checking, for example, every time the terminal device adjusts its time.

The triggering condition of the scheduler task. For example, any task which should be processed, yet has not been processed, during the jumping time period or caused by the time adjustment.

(3) The processing rules. The scheduler task is processed based on the predetermined processing procedure, i.e., the processing rules delivered by the DM server or pre-set by the user, or the scheduler task is processed upon a user's choice or based on the default procedure. The processing rules delivered by the DM server include: processing the task immediately, delaying to a certain time, or canceling the processing, and reporting to the DM server. For example, for a scheduler type 1 task, the user can choose to process the task immediately, or delay the task to a certain time, or cancel the processing. For a scheduler type 2 task, the user can't choose to cancel the processing; For a scheduler type 3 task, the user can choose to process the task immediately or cancel the processing; For a scheduler type 4 task, the user is not allowed to make any choice, and the terminal device will directly process the task based on the default setting. For the type 1, 2 or 3 task, the user can also preset a processing procedure, and when the type 1, 2 or 3 task is processed, the user will not be prompted for input. The tasks will be automatically processed according to the predetermined processing procedure.

S2. A user may choose to activate or not to activate the triggering condition. If the user chooses not to activate the triggering condition, the scheduler task will be processed in the same way as that in the prior art. If an abnormal condition occurs, the user will be not notified. If the user chooses to activate the triggering condition, the occurrence of any abnormal condition is monitored.

S3. The system time of the terminal device is adjusted, for example, the system time is adjusted from 20:00 to 22:00.

S4. Check if there is any task which should be processed during the time period between 20:00 to 22:00. Obviously there may be more than one scheduler tasks in that period.

S5. If there is at least one scheduler task, the terminal device will choose one task to process.

S6. Decide if a user's input is required based on the triggering condition and the processing rules.

S7. If the user's input is required, the system prompts the user to choose the triggering time for the task. For example, if the chosen task is a type 1 task, i.e., it does not exceed its processing time limit, the user can choose either to process the task immediately, or not to process the task, or to delay the processing to a later time; or if the chosen task is a type 3 task, i.e., the task that exceeds the last processing time limit and has not been processed, the user can choose either to process the task immediately or not to process the task.

S8. If the user's input is not required, the terminal device processes the scheduler task based on the predetermined processing rules and the default setting. For example, the task is processed directly.

S9. After the scheduler task is processed upon the user's choice, or is processed by the terminal based on the predetermined processing rules or the default procedure, check if there are any other scheduler tasks to be processed. If there are, jump to the step of choosing one scheduler task to be processed, and continue the processing.

EXAMPLE 4

Figure 4:
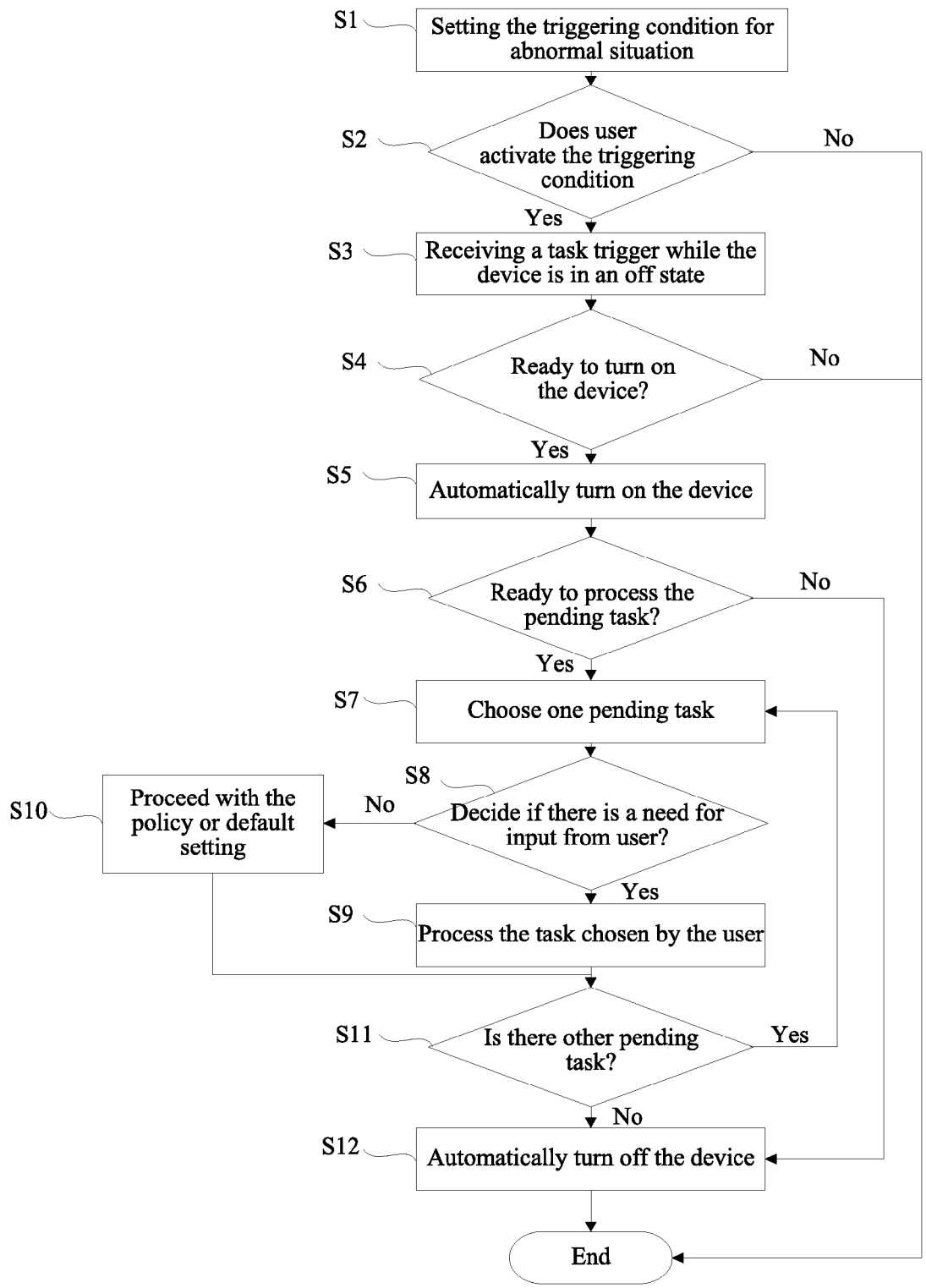
FIG. 4 is a task processing flow chart of a terminal device in an off state according to an embodiment of the present invention.

The condition under which the current state of the terminal device interferes with task processing. The flow chart is shown in FIG. 4, and the steps are as follows:

S1. Setting the triggering condition in the terminal device. The triggering condition includes:

The condition for determining an abnormal condition, that is, when the triggering time for the task is up, the terminal device is in an off state.

The triggering condition of the scheduler task. The task should be processed when the terminal device is in an off state.

The condition for allowing the device to be automatically turned on. For example, only when the terminal device is in an airplane mode (a user sets the terminal device off during his flight, usually the airline will not allow a user to turn on the terminal device), the device is not allowed to be turned on.

The triggering condition on which the scheduler task can be processed. For example, the processing is allowed only when the electric quantity of the battery is above 5% of its capacity, or the signal strength is limited.

The processing rules. The processing rules include: the task is processed based on the predetermined processing procedure, that is, the processing rules delivered by the DM server or pre-set by the user, or the scheduler task is processed at a user's choice, or based on the default procedure. The processing rules delivered by the DM server include: processing the task immediately, delaying to a certain time, or canceling the process, and reporting to the DM server. For example, for a scheduler type 1 task, the user can choose to process the task immediately, or delay the task to a certain time, or cancel the processing. For a scheduler type 2 task, the user can't choose to cancel the processing; For a scheduler type 3 task, the user can choose to process the task immediately or cancel the processing; For a scheduler type 4 task, the user is not allowed to make any choice, and the terminal device will directly process the task based on the default setting. The user of type 1, 2 or 3 task can preset a processing strategy, such as that the user will not be prompted for an input and the task will be processed based on a preset processing strategy when a type 1, 2 or 3 task is processed.

S2. A user may choose to activate or not activate the triggering condition. If the user chooses not to activate the triggering condition, the operation is the same as that in the prior art; the user is not reminded when an abnormal condition occurs. If the user chooses to activate the 1-2 triggering condition, the system starts monitoring the occurrence of the abnormal condition.

S3. When an abnormal condition occurs, for example, a user sets a task which is to report to DMS at 19:00 about the terminal device's current location, while the terminal device is in an off state at 19:00. Obviously there may be more than one task that should be processed at 19:00.

S4. The terminal device checks if it is ready to be turned on.

S5. If the user does not activate the airplane mode (no cell phone or other devices can be turned on during the flight), the terminal device can automatically be turned on if its battery condition allows.

S6. The terminal device checks if it is ready to process the scheduler task.

S7. Select one scheduler task to be processed if the terminal device's battery condition is capable and its signal strength meets the processing requirement.

S8. Check if the user's input is required based on the triggering condition and the processing rules.

S9. If the user's input is required, the terminal device will prompt the user to choose the trigger time for the task. For example, if the chosen task is a type 1 task, the user can choose to process the task immediately, or not to process the task or to delay the processing to a later time.

S10. If the user's input is not required, the terminal device processes the task based on the predetermined processing procedure and the default setting. For example, the position information of the terminal device is sent directly to DMS.

S11. After the scheduler task is processed upon the user's choice, or be processed by the terminal based on the predetermined processing rules or the default procedure, check if there are any other scheduler tasks to be processed. If there is, jump to the step of choosing one scheduler task to be processed, and continue to the processing therefrom. Otherwise, the terminal device is automatically turned off.

The OMA DM specification defines DM system's overall structure, protocols and communication mechanism, as well as security in device management. A terminal device management system is provided in the present invention, which is demonstrated through the embodiments of the invention, through which the terminal device management is achieved by utilizing the DM protocols to send the scheduler task.

The terminal device management system includes: interconnected terminal devices and a device management server. The device management server communicates with the terminal devices through DM protocols.

Figure 5:
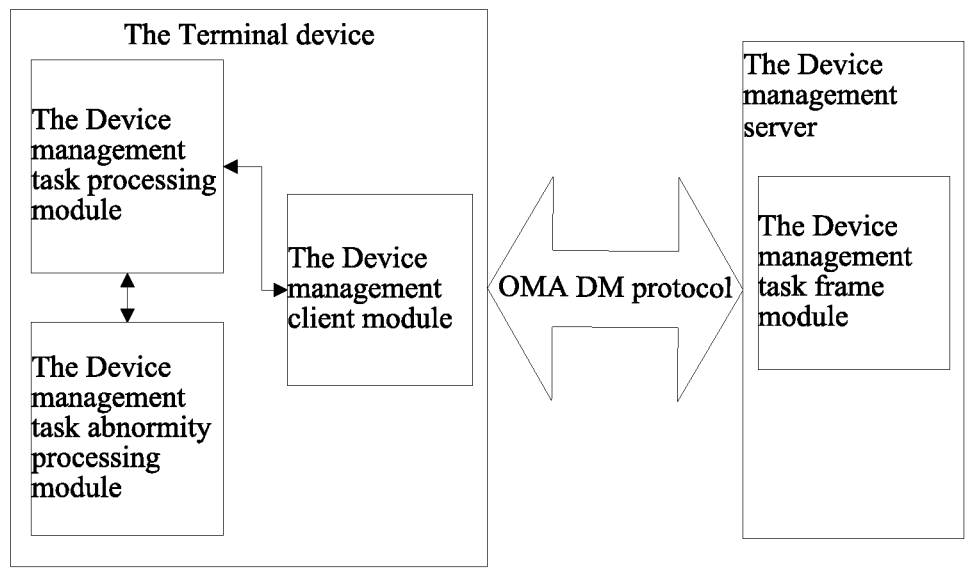
FIG. 5 is a schematic of the system according to an embodiment of the present invention.

With reference to FIG. 5, a terminal device further includes interconnected device management client module, device management task processing module and device management task abnormity processing module. A device management server further includes a device management task frame module, and the device management task frame module communicates with the device management client module through DM protocols.

Figure 6:
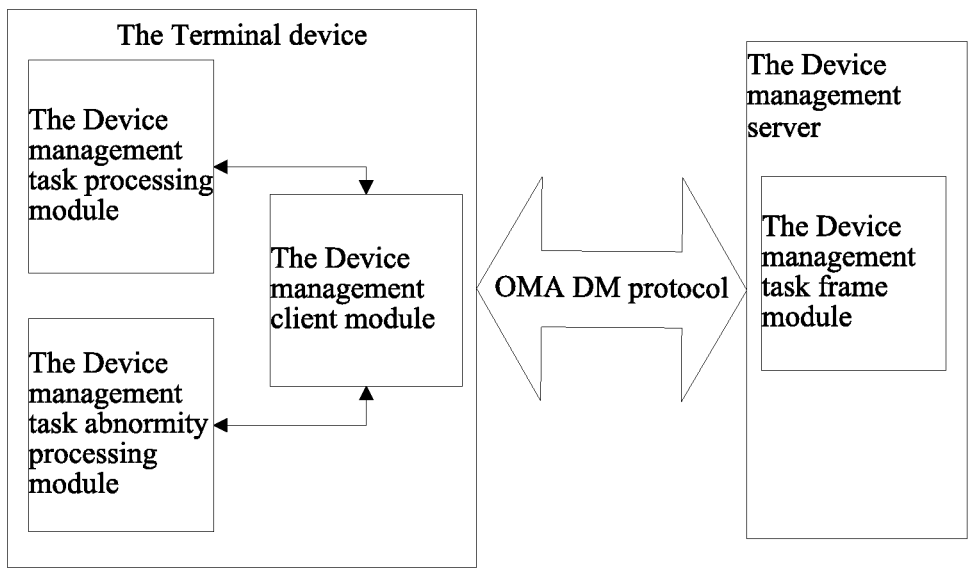
FIG. 6 is a schematic of the system according to an embodiment of the present invention.

Or, with reference to FIG. 6, the terminal device further includes device management task processing module and device management task abnormity processing module, each connecting separately with the device management client module. The device management server further includes a device management task frame module; and the device management task frame module communicates with the device management client module through DM protocols.

The device management task frame module is used to send tasks to the terminal device, and process the interaction result and execution result sent by the terminal device.

The device management task abnormity processing module is used to process the scheduler task which is sent by the device management server through the DM protocols and is transferred by the device management client module, and report the execution result to the uplink through the device management client module. The scheduler task includes: installing/setting task, monitoring task condition, and controlling triggering task. The module is also used to transfer the interaction result sent by the device management task abnormity processing module.

The device management task abnormity processing module is used to monitor abnormal condition during the execution of a task, based on the execution condition (including time, event, etc.) of scheduler task set by the terminal device. A processing strategy for abnormal task can be set in the module (for example, if the task has missed the triggering condition, the processing is given up, and the result is transferred to the DM server), and judge if the execution of the scheduler task is normal or not based on the strategy combined with the execution condition.

When an abnormal condition occurs, the device management task abnormity processing module will process the scheduler task based on the predetermined processing rules or the default procedure, and transfer the processing result to the device management task processing module.

There are interfaces between the device management task abnormity processing module and the device management task processing module, which are used to transfer the processing result to the device management server through the device management task processing module and the device management client module. Or there exist interfaces between the device management task abnormity processing module and the device management client module, which are used to transfer the processing result through the device management client module.

The device management client module, directly exchanging with the device management server, is used to transfer the interaction command of the device management server and terminal device, that is, it is used not only to transfer scheduler task sent by the device management server to the device management task processing module, but also to transfer the task execution result of the device management task processing module to the device management server; further, it is used to transfer the interaction result of the device management task abnormity processing module to the device management server.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

Although the present invention has been fully described in connection with the preferred embodiments thereof with reference to the accompanying drawings, it is apparent to those skilled in the art that various changes and modifications can be made. Such changes and modifications are intended to be included within the scope of the present invention provided that they fall within the scope as defined by the appended claims and their equivalence.

What is claimed is:

1. In a terminal device configured to process tasks, a method for processing a task in device management, the method comprising:
    receiving, from a device management server, a scheduler task, an execution condition for executing the scheduler task, and a processing rule for processing the scheduler task if the scheduler task has missed the execution condition because the terminal device adjusts a system time of the terminal device, wherein the processing rule includes executing the scheduler task immediately, executing the scheduler task after a delay, or canceling the scheduler task;
    adjusting the system time of the terminal device by an adjustment time;
    determining that the scheduler task has missed the execution condition of the scheduler task during a jumping period caused by the adjustment time; and
    executing or canceling the scheduler task based on the processing rule.

2. A terminal device that can process tasks, the terminal device comprising:
    a receiver configured to receive, from a device management server, a scheduler task, an execution condition for executing the scheduler task, and a processing rule for processing the scheduler task if the scheduler task has missed the execution condition because the terminal device adjusts a system time of the terminal device, wherein the processing rule includes executing the scheduler task, or canceling the scheduler task;
    a processor; and
    a non-transitory computer readable storage medium storing computer executable instructions that, when executed by the processor, cause the terminal device to adjust the system time of the terminal device by an adjustment time, to determine that the scheduler task has missed the execution condition of the scheduler task during a jumping period caused by the adjustment time, and to execute or cancel the scheduler task based on the processing rule.

3. In a terminal device configured to process tasks, a method for processing a task in device management, the method comprising:
    receiving, from a device management server, a scheduler task, an execution condition for executing the scheduler task, and a processing rule for processing the scheduler task if the scheduler task has missed the execution condition because the terminal device is in an off state, wherein the processing rule includes executing the scheduler task immediately or canceling the scheduler task;
    turning on from an off state after the terminal device shuts down;
    determining during turn-on time of the terminal device that the scheduler task has missed the execution condition of the scheduler task during the last period of the off state which is between a shutdown time and the turn-on time using the shutdown time as the starting time for the determining; and
    executing the scheduler task immediately or canceling the scheduler task based on the processing rule without any user interaction.

4. A terminal device that can process tasks, the terminal device comprising:
    a receiver configured to receive, from a device management server, a scheduler task, an execution condition for executing the scheduler task, and a processing rule for processing the scheduler task if the scheduler task has missed the execution condition because the terminal device is in an off state, wherein the processing rule includes executing the scheduler task immediately or canceling the scheduler task;
    a processor; and
    a non-transitory computer readable medium storing computer executable instructions that, when executed by the processor, cause the terminal device to turn on from an off state after the terminal device shuts down, to determine during turn-on time of the terminal device that the scheduler task has missed the execution condition of the scheduler task during the last period of the off state which is between a shutdown time and the turn-on time using the shutdown time as the starting time for the determining, and to execute the scheduler task immediately or cancel the scheduler task based on the processing rule without any user interaction.

* * * * *